Nov. 7, 1939.   C. H. WILLIS   2,179,366
ELECTRIC VALVE CONVERTING SYSTEM
Filed Jan. 28, 1938
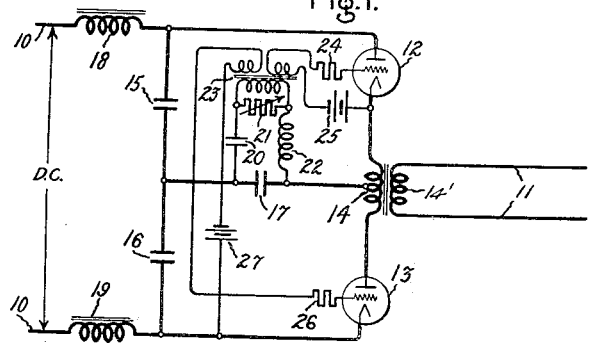
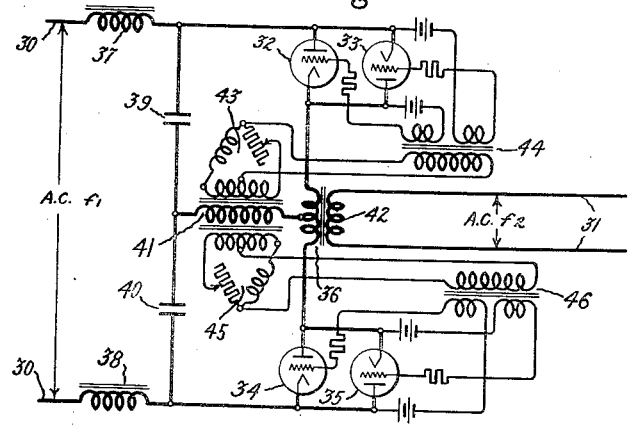
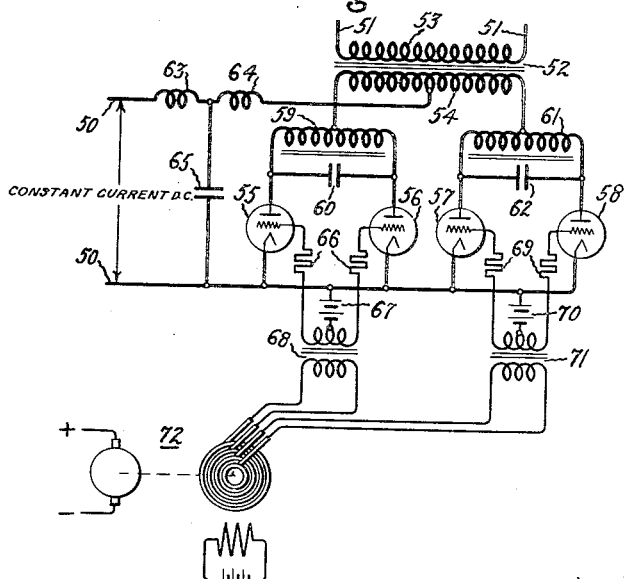
Inventor:
Clodius H. Willis,
by Harry E. Dunham
His Attorney.

Patented Nov. 7, 1939

2,179,366

UNITED STATES PATENT OFFICE 2,179,366

ELECTRIC VALVE CONVERTING SYSTEM

Clodius H. Willis, Princeton, N. J., assignor to General Electric Company, a corporation of New York Application January 28, 1938, Serial No. 187,410

8 Claims. (Cl. 175—363)

My invention relates to electric valve converting systems and more particularly to such systems suitable for transmitting energy from a source of current to a relatively high frequency load circuit.

Heretofore there have been devised numerous electric valve converting systems for transmitting energy from a source of current to a relatively high frequency alternating current load circuit such as for example an induction furnace. When supplying current to such load circuit it is particularly desirable to provide a relatively simple apparatus involving a minimum number of tubes which will supply a frequency sufficiently high to operate the furnace satisfactorily. In such arrangements it is furthermore desirable to limit the current flowing through the valves of the converting apparatus upon the occurrence of any abnormal condition of the valves. It has generally been understood that the time necessary for deionization of the valves limited the frequency of the current supplied to the output circuit. In accordance with my invention I obtain a much higher output frequency than was hitherto obtainable by arranging the conductivities of the valves so that a short time interval occurs between the conductivities of successive valves. Furthermore in accordance with my invention the current through the valves is limited during abnormal conditions of the valves by supplying the electric valve converting apparatus from a source of constant current.

It is, therefore, an object of my invention to provide an improved electric valve converting apparatus which will overcome the above-mentioned disadvantages of the arrangements of the prior art and which will be simple and reliable in operation.

It is another object of my invention to provide an improved electric valve converting apparatus which is capable of satisfactory operation at a relatively high frequency and in which upon the occurrence of abnormal conditions of the valves, the current therethrough is limited to a predetermined value.

My invention will be better understood from the following description when considered in connection with the accompanying drawing and its scope will be pointed out in the appended claims.

Referring to the drawing, Fig. 1 illustrates an embodiment of my invention which converts direct current into relatively high frequency alternating current; Fig. 2 shows an apparatus for converting alternating current into relatively high frequency alternating current; and Fig. 3 shows another modification for converting constant current direct current into relatively high frequency alternating current.

Referring more particularly to Fig. 1, I have shown therein an electric valve converting system for transferring energy from a direct current source 10, which preferably has a constant current characteristic, to a high frequency alternating current load circuit 11. If the alternating current circuit 11 is connected to apparatus such as an electric induction furnace it may be desirable to select the components of the load circuit so that they together with the reflected impedance of the output circuit of the electric valve converting apparatus will constitute a circuit having a resonant frequency approximately equal to the desired operating frequency. The electric valve converting system utilizes a pair of electric valves 12 and 13 which are interconnected by an inductive winding 14. While the valves 12 and 13 have been shown as comprising an anode, a cathode and a control grid, it is to be understood that these valves may be any of those commonly utilized in the art which have an anode, and a cathode contained within an envelope containing an ionizable medium, and a control or starting electrode. A pair of capacitors 15 and 16 are each arranged to be effectively connected across a portion of the inductive winding 14 and one of the valves 12 or 13 through a series capacitor 17. In order to prevent any undesired interaction between the direct current source and the electric valve converting apparatus a pair of inductors 18 and 19 may be connected between the apparatus and the source of current. The output circuit 11 is arranged to be energized from the inductive winding 14 either by means of an auto-transformer connection or a secondary winding 14'.

A shunt circuit comprising a capacitor 20, a resistor 21, and an inductor 22 connected across the capacitor 17 provides a potential having the proper phase relation with respect to the potentials appearing across the valves for the valves 12 and 13.

The potential appearing across the resistor 21 is impressed upon the primary winding of a transformer 23 which is provided with a plurality of secondary windings each of which is connected into one of the control circuits for the valves 12 and 13. The control circuit for the valve 12 therefore includes a current limiting resistor 24, one of the transformer windings of the transformer 23 and a suitable source of biasing potential 25. Similarly the control circuit for the electric valve 13 includes the current limiting resistor 26, one of the secondary windings of the transformer 23 and a suitable source of biasing potential 27. At the end of the period of conductivity of each of the valves the capacitor 20 discharges through its associated circuit comprising the capacitor 20, the resistor 21 and the inductor 22 so that the potential impressed across the transformer primary winding of the transformer 23 is such as to render the next succeeding valve conductive. Oppositely, of course, if it is desired any other suitable source of energization may be supplied to the primary winding of the transformer 23 since it is not necessary that the valve converting system be self-excited as shown. In case an auxiliary control potential is utilized capacitor 17 may be omitted and a direct connection utilized between the capacitors 15 and 16 and the intermediate tap on the inductor 14.

In order to start the apparatus a positive potential may be applied to the control electrode of the valve 12 by any suitable means. It therefore will be assumed that the valve 12 has just been rendered conductive and that current flows from the upper terminal of the constant current direct current circuit 10 through the valve 12 to the upper half of the inductive winding 14 and through the capacitors 16 and 17. This flow of current through the capacitor 16 will cause the capacitor to assume a charge which will be sufficient to cause the electric valve 12 to cease conducting current. During the next interval of time which is relatively short with respect to the period of conductivity of the valve 12 neither of the valves is conductive and current now flows from the upper terminal of the source 10 through the inductive winding 18, capacitor 15, capacitor 16 and the inductive winding 19. The charge on the capacitor 17 tends to cause current to flow through the capacitor 20, resistor 21 and inductor 22 so that the potential appearing across resistor 21 and the transformer 23 is now such as to render the electric valve 13 conductive. The electric valve 13 now being conductive current flows from the upper terminal of the direct current circuit 10 through inductor 18, capacitors 15 and 17, the lower half of inductive winding 14 through inductor 19. During the period of the conductivity of the valve 13 the capacitor 16 now discharges through capacitor 17, the lower half of the inductive winding 14, and the electric valve 13. At the end of the period of conductivity of the electric valve 13 current continues to flow through the inductive winding 18, the capacitor 15, the capacitor 16 and the inductive winding 19. The charge on the capacitor 17 now causes current to flow through the resistor 21 so that the potential appearing across the transformer 23 is sufficient to cause the valve 12 to be rendered conductive. At the time the electric valve 12 is conductive the charge appearing across the capacitor 15 flows through the electric valve 12, the upper half of the inductive winding 14 and capacitor 17. It will be apparent to those skilled in the art that the frequency of the alternating potential appearing across the output circuit 11 is twice the frequency of the alternating current flowing through the capacitor 17. Since the flow of current from the source 10 to the electrical converting apparatus is constant at all times, I am enabled by this feature of my invention to prevent damage to the apparatus and serious interruption to the operation of the apparatus upon occurrence of abnormal conditions in the conductivity of either of the valves 12 or 13 since these valves do not carry current great enough to destroy any of the apparatus.

In Fig. 2 there is shown an arrangement in which the same principles of invention have been applied to an electric valve converting system for supplying a relatively high frequency alternating current circuit from a source of alternating current which preferably has a constant current characteristic. Current is transmitted from a source of alternating current 30 to a relatively high frequency alternating curren load circuit 31 by means of two pairs of electric valves 32, 33 and 34, 35. The valves 32 and 34 are connected in like manner together with the series inductive winding 36 directly across the alternating current circuit 30. The valve 33 is connected in opposite sense across valve 32 and similarly valve 35 is connected in opposite sense across valve 34. Suitable reactors 37 and 38 are connected between the source of alternating current 30 and electric valve converting apparatus in order to prevent undesired interaction between the apparatus and the source of current. A pair of series connected capacitors 39 and 40 are connected across the alternating current supply circuit. A connection from a point intermediate the capacitors 39 and 40 includes an inductive winding 41 and is connected to an intermediate point on the inductor 36. The output circuit 31 is arranged to be energized from the inductive winding 36 either by an autotransformer connection or by a transformer winding 42. A suitable phase shifting circuit 43 is energized from the inductive winding 41 and this phase shifting circuit supplies potential of proper phase relation to the control circuit of the valves 32 and 33 by means of the transformer 44 which is provided with a primary winding and two secondary windings. Each of the control circuits of the valves 32 and 33 includes one of the secondary windings of the transformer 44 together with a suitable source of biasing potential and a current limiting resistor. The inductive winding 41 also energizes another phase shifting circuit 45 which in turn supplies energy to the transformer 46 which comprises a primary winding and two secondary windings. Each of the control circuits of the valves 34 and 35 includes one of the secondary windings of the transformer 46 together with a suitable source of biasing potential and a current limiting resistor. When the upper terminal of the alternating current circuit 30 is positive in potential the electric valves 32 and 34 will operate in manner similar to the operation described in connection with valves 12 and 13 in Fig. 1. Thus the capacitors 39 and 40 will become alternately charged and discharged in a similar manner. When the lower terminal of the alternating current circuit 30 is positive the valves 33 and 35 will operate in sequence in the same manner as did valves 12 and 13 in the circuit arrangement shown in Fig. 1. Since this operation is analogous to the operation set forth in the description in connection with Fig. 1 it is believed that no further detailed description of this arrangement is necessary.

In Fig. 3 there is shown an arrangement for transmitting energy from a constant current direct current supply circuit 50 to an alternating current circuit 51 of relatively high frequency. The electric valve converting apparatus includes the output transformer 52 which is provided with a secondary winding 53 connected to the alternating current circuit 51 and a primary winding 54 which is connected at an intermediate point thereon to one side of the direct current supply circuit. The end terminals of the primary winding 54 of the transformer 52 are interconnected to the other side of the direct current circuit through groups or pairs of electric valves 55 and 56, and 57 and 58, respectively. While each of the valves 55 to 58 inclusive, is shown as being provided with an anode, a cathode and a control electrode or grid, they may be of any of the several types well known in the art although it is preferable to utilize valves having an anode, a cathode and a control or ignition electrode enclosed within an envelope containing an ionizable medium. Interposed in the connection from the winding 54 to the pair of electric valves 55 and 56 is a commutating circuit including a transformer winding 59 having an electrical midpoint thereon connected to one terminal of the winding 54 and the end terminals of the winding 59 are connected to corresponding electrodes of the electric valves 55 and 56. A commutating capacitor 60 is connected across winding 59 and the winding 59 acts effectively as a series autotransformer so that the capacitor 60 is effectively in series circuit relation with the load current of the apparatus. Similarly, a commutating circuit comprising a winding 61 and a capacitor 62 is interposed in the connections of the winding 54 of the transformer 52 to the electric valves 57 and 58. Another circuit comprising the smoothing reactors 63, 64 and a capacitor 65 is preferably interposed between the apparatus and the direct current circuit 50 in order to minimize any interaction between the apparatus and the constant current direct current circuit 50.

The control circuits for the valves 55 and 56 each contain one of the current limiting resistors 66, a suitable source of biasing potential 67 and a portion of the secondary winding of the transformer 68. The electric valves 57 and 58 are controlled by similar control circuits including one of the current limiting resistors 69, a suitable source of biasing potential 70 and a portion of the secondary winding of the transformer 71. The primary windings of the transformers 68 and 71 are energized from different phases of a source of polyphase alternating potential of a frequency which is a submultiple of that which it is desired to supply to the load circuit 51. In the arrangement shown the transformers are energized from the two phases of a quarter phase auxiliary motor generator set 72 which is operated to supply a control frequency one-half that at which the circuit 51 is to operate.

In operation it will be assumed that the electric valve 55 is initially rendered conductive by means of the control transformer 68. Under these conditions current will flow from the upper terminal of the direct current circuit 50 through the inductors 63, 64 and the left-hand portion of inductive winding 54, the left-hand portion of the inductive winding 59 and the electric valve 55 to the other side of the direct current circuit 50 thus generating a half cycle of alternating current in the transformer winding 53 which is connected to the load circuit 51. Due to the high exciting impedance of the winding 59 the current flowing in the left-hand portion must be balanced by a substantially opposite current flowing in the right-hand portion, the only path for which includes the commutating capacitor 60. Thus the capacitor 60 is effectively in series circuit relation with the load circuit of the apparatus and it becomes charged to a potential dependent in magnitude upon the load current and the time intervals during which current flows through the electric valve 55. Substantially 90 electrical degrees later with respect to the control potential supplied by the motor generator 72, the electric valve 57 is rendered conductive and the potential which has been built up on capacitor 60 is effective to commutate the current from the electric valve 55 to the electric valve 57. During the period of conductivity of the electric valve 57 current flows through the right-hand portion of inductive winding 54 generating a half cycle of alternating current of opposite polarity which is supplied to the load circuit 51. At the same time current is flowing through the left-hand portion of the inductor 61 and the capacitor 62 is being charged in manner similar to that described in connection with the charging of capacitor 60. Due to the fact that the exciting impedance of the transformer winding 59 is very high and because of the fact that the electric valves 55 and 56 are both now nonconductive, the charge on the capacitor 60 is substantially retained during the completing interval in which current is flowing through the electric valve 57.

Substantially 90 electrical degrees later with respect to the potential supplied by the control circuit, the electric valve 56 is rendered conductive and the potential across the capacitor 62 is effective to transfer the current from the electric valve 57 to the electric valve 56. The current flowing through the electric valve 56 is now effective to discharge the capacitor 60 and to recharge it to an equal potential of opposite polarity so that it will be effective to commutate the load current from the electric valve 56 to the electric valve 58 which will be the next valve to be rendered conductive. Thus in this manner current is successively commutated or transferred between the several electric valves, current flowing in only a single electric valve at any given instant and the current being transferred between a valve from each of the pairs 55, 56, and 57, 58, and also being successively transferred between the electric valves of each pair. Thus it will be apparent that each electric valve is conductive for one half cycle of alternating current with respect to the load circuit 51 and is idle for three half cycles of alternating current with respect to the load circuit. Since in accordance with my invention the supply circuit is of a constant current direct current type, excessive destructive current does not flow through the apparatus whenever there is any abnormal conductivity of any of the valves.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The combination comprising a source of current, a high frequency load circuit, and an electric valve converting system for transmitting energy from said source to said load circuit, said converting system comprising a plurality of electric discharge valves interconnected by an inductor and being arranged across said source of current, a plurality of capacitors each connected across a different portion of said inductor and said valves, means for energizing said load circuit from said inductor, and means for controlling the conductivities of said valves.

2. The combination comprising a source of current, a high frequency load circuit and an electric valve converting system interconnecting said source and said circuit, said converting system comprising a plurality of controlled electric discharge valves interconnected by an inductive winding, means connecting said valves and inductive winding across said source of current, a plurality of capacitors each connected from an intermediate point on said inductive winding to a different side of said source of current, means for periodically rendering conductive said valves to charge and discharge said capacitors, and means for energizing said load circuit from said inductive winding.

3. The combination comprising a source of constant current, a high frequency load circuit, and an electric valve converting system for transmitting energy from said source to said load circuit, said converting system comprising a plurality of electric discharge valves interconnected by an inductor and being arranged across said source of constant current, a plurality of capacitors each connected across a portion of said inductor and said valves, means for energizing said load circuit from said inductor, and means for controlling the conductivities of said valves.

4. The combination comprising a source of constant current, a high frequency load circuit and an electric valve converting system interconnecting said source and said circuit, said converting system comprising a plurality of controlled electric discharge valves interconnected by an inductive winding, means connecting said valves and inductive winding across said source of constant current, a plurality of capacitors each connected from an intermediate point on said inductive winding to a different side of said source of constant current, means for periodically rendering conductive said valves to charge and discharge said capacitors, and means for energizing said load circuit from said inductive winding.

5. The combination comprising a source of constant current direct current, a pair of electric discharge valves interconnected by an inductor, a capacitor, a circuit including one of said valves and a portion of said inductor for charging said capacitor, a circuit including the other of said valves and a portion of said inductor for discharging said capacitor, means for energizing a load circuit from said inductor, and means for controlling the discharges of said valves.

6. The combination comprising a source of constant current alternating current of relatively low frequency, a high frequency load circuit and an electric valve converting system for transmitting energy from said source to said load circuit, said converting system comprising a plurality of electric discharge valves interconnected by an inductor and being arranged across said source of constant current, a plurality of capacitors each connected across a portion of said inductor and said valves so as to be charged and discharged thereby, means for energizing said load circuit from said inductor, and means for controlling the conductivities of said valves.

7. The combination comprising a source of constant current, a high frequency load circuit and an electric valve converting system interconnecting said source and said circuit, said converting system comprising a plurality of controlled electric valves interconnected by an inductive winding, a capacitor associated with each of said valves and arranged to be charged in series with one of said valves and discharged in series with another of said valves, means for periodically rendering conductive said valves, said means and said capacitors cooperating to cause each valve to be conductive for substantially one cycle of the alternating current potential appearing in said load circuit, only one valve being conductive during any cycle of said alternating current, and means for energizing said high frequency load circuit from said inductive winding.

8. The combination comprising a source of constant current, a high frequency load circuit and an electric valve converting system interconnecting said source and said circuit, said converting system comprising a plurality of controlled electric discharge valves interconnected by an inductive winding, means connecting said valves and inductive winding across said source of constant current, a plurality of capacitors each arranged to be charged in series with one of said valves and discharged in series with another of said valves, means for periodically rendering conductive said valves to charge and discharge said capacitors, and means for energizing said load circuit from said inductive winding.

CLODIUS H. WILLIS.